Patented Oct. 15, 1946

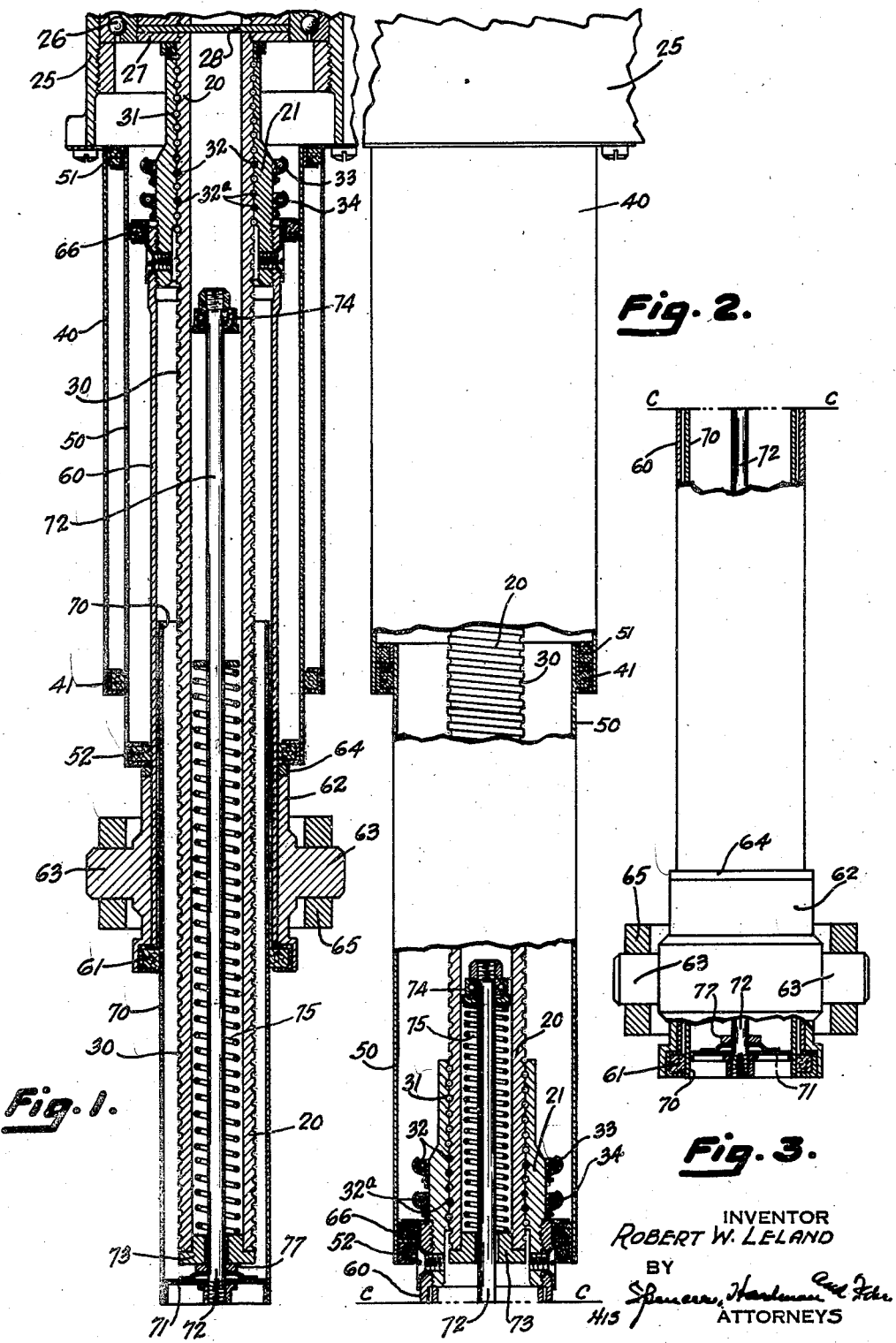

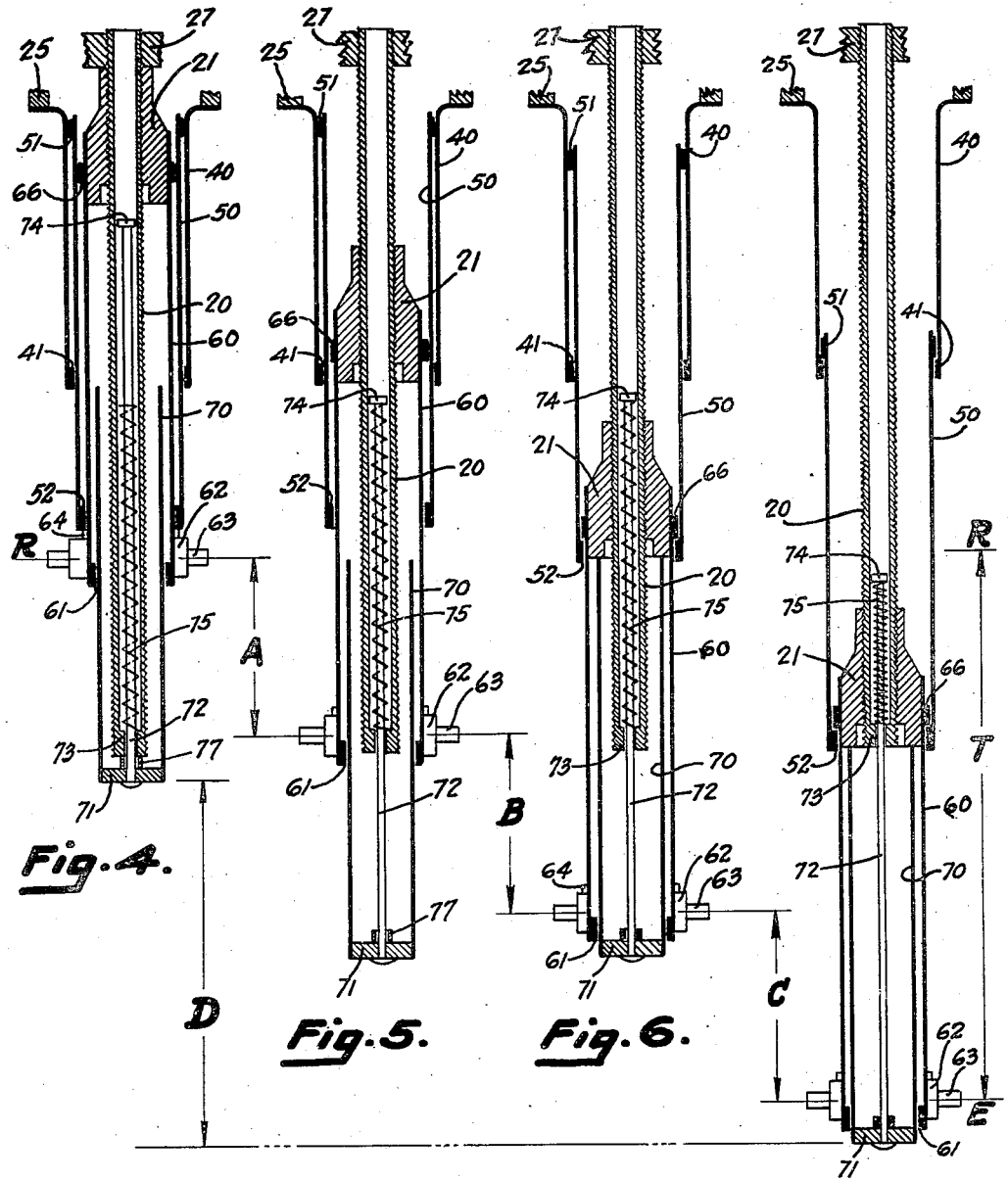

2,409,288

UNITED STATES PATENT OFFICE 2,409,288

ACTUATOR SEAL

Robert W. Leland, Dayton, Ohio, assignor to General Motors Corporation, Detroit, Mich., a corporation of Delaware Application February 24, 1945, Serial No. 579,521

10 Claims. (Cl. 74—424.8)

This invention relates to improvements in load transfer devices and particularly such devices in which the load supporting member is carried by a shaft upon which said member is adapted to move longitudinally.

It is among the objects of the present invention to provide a load transfer device, having the load supporting member carried by a shaft, with a sealing shield completely surrounding the member and shaft to protect them against dust and grit, said shield being extensible and collapsible in response to movement of said member and in accordance with the position of said member on the shaft.

A further object of the present invention is to provide a load transfer device with a dust shield the difference of overall length of which when fully collapsed and when fully extended being less than the complete distance of load transfer.

Further objects and advantages of the present invention will be apparent from the following description, reference being had to the accompanying drawings, wherein a preferred embodiment of the present invention is clearly shown.

In the drawings:

Fig. 1 is a fragmentary sectional view of the load transfer mechanism in fully retracted position.

Fig. 2 is part sectional view of a portion of the mechanism shown in Fig. 1, the parts being shown in fully extended position, however. The line C—C is the bottom cut-off line of this figure and is coincidental with the top cut-off line C—C of Fig. 3.

Fig. 3 is an extended view of Fig. 2, showing the lower portion of the mechanism when fully extended.

Fig. 4 is a diagrammatic view of the load transfer device in its fully retracted position.

Fig. 5 is a similar view showing the device at the position of its completed first stage of movement.

Fig. 6 shows the device having completed its second stage of movement.

Fig. 7 shows the device in its fully extended position.

The load transfer device of the present invention comprises a rotatable screw shaft 20 which carries a nut 21 operative in response to rotation of the screw shaft in one direction or the other, to move longitudinally relatively to the screw shaft for transferring a load, carried by the nut, and rendering it non-rotatable.

Any suitable prime mover may be connected to the screw shaft 20 to rotate it. For instance a reversible electric motor may serve as prime mover, the numeral 25 designating the lower portion of the motor housing in which a ball bearing 26 supports the driving element 27 of the motor, which element is connected to the screw shaft by a cross pin 28.

The screw shaft 29 is tubular. The nut 21 is threadedly secured thereto but not in the conventional manner where screw threads on the shaft operatively engage similar screw threads in the nut. Such a construction would serve in devices of this kind, however, frictional resistance is an undesirable factor which is substantially eliminated by the construction shown in Fig. 1. Instead of the ordinary screw threads, the screw shaft has a helical groove 30 substantially semi-circular in cross section. This groove 30 is cut in the outer peripheral surface of the screw shaft for substantially its entire length. A helical groove 31 of the same size and pitch is cut in the inner annular surface of the nut 21 which slidably fits on the screw shaft. The coinciding grooves 30 of the screw shaft and 31 of the nut form a helical groove, circular in cross section. In order mechanically to connect the nut with the shaft, ball bearings are provided in the helical passage. For increased strength two separate groups of ball bearings 32 and 32a are provided each filling about a convolution and a half of the helical groove between the nut and shaft and a by-pass duct on the outside of the nut and in communication with the respective helical grooves. The by-pass duct of one group of ball bearings is designated by the numeral 33, the other by the numeral 34.

The object of the present invention is to provide a load transfer device with a shield adapted to be elongated as the device moves the load toward one position and to be contracted as the load is returned to its original position. The shield at all times completely encloses the working parts of the device, especially the screw and nut thereof to protect them against dust and dirt. As designed, the present device, in moving from fully contracted to fully extended position, will move the load through a greater distance as for instance the distance T, Fig. 7, than the increase in length of the device itself as indicated at D, Fig. 4.

The drawings of the present application show the shield as comprising four telescopically engaging tubular members 40, 50, 60 and 70.

The tubular member 40 may be termed the outer or stationary tube. It is anchored to the housing 25 in any suitable manner. Inside the tube 40 at its outer or free end there is provided a sealing ring 41 which surrounds and frictionally engages the next adjacent or intermediate tube 50.

The intermediate tube 50 is telescopically received by the outer tube 40. As shown in Fig. 1, the inner end of tube 50 is normally in alignment with the anchored end of the outer tube 40. In this description, the word "normal" signifies that the nut 21 is in its fully retracted position as shown in Fig. 1. A sealing and abutment ring 51 surrounds and is attached to the tube 50 at its inner end, said ring frictionally engaging the adjacent tube 40. Inside and at the opposite end of tube 50 there is provided a sealing and abutment ring 52 frictionally engaging the adjacent tube 60.

Tube 60, called the nut-tube, has its inner end attached to the nut 21 so as to move therewith. This tube 60 is telescopically received by the tube 50, a portion extending beyond the outer end of tube 50. An internal sealing ring 61 is secured at the outer end of tube 60 and frictionally engages tube 70 so that under certain circumstances, movement of tube 60 will carry with it the tube 70. Under other circumstances, sealing ring 61 permits relative movement between tubes 60 and 70. Surrounding the end of tube 60 attached to the nut 21 is a sealing and abutment ring 66 which frictionally engages the adjacent tube 50.

A trunnion 62, having oppositely disposed load supporting lugs 63, is attached to tube 60 adjacent its outer end. A bumper ring 64 of any suitable shock absorbing material is carried by the trunnion 62 for engagement with the abutment ring 52 under certain operating conditions. The load 65, supported by the trunnion lugs 63 may be of any type, for instance, it may be a lever attached to a bomb-bay door of an airplane, it may be a lever attached to the flaps or louvers on an airplane or one secured to any sort of device or body to be moved or operated from one position to another, accomplished by the longitudinal movement of the nut on the shaft between the retracted position shown in Fig. 1 and the fully extended position shown in Fig. 2. The load 65, carried by the trunnion 62 attached to the tube 60 and it in turn anchored to the nut 21, holds said nut against rotation so that it moves longitudinally on the screw shaft in response to rotation of said shaft.

The fourth or innermost tube 70 is telescopically received by the nut-tube 60 and normally extends about half way into the nut-tube so as to space the inner end of said tube 70 from the bottom end of the nut which, at a certain time, is adapted to engage the tube 70. As has previously been stated, the sealing ring 61 on tube 60 frictionally engages tube 70 so that at times these two tubes move in unison. An enclosure disc 71 is secured in tube 70 adjacent its outer end, said disc being centrally apertured to receive the one end of a rod or staff 72 which slidably extends through a central opening in an end plate 73 secured to the end of the screw shaft 20. This rod 72 extends coaxially into the screw shaft and is of such a length that a head member 74, secured to its inner end, normally lies slightly beneath the level of the lower edge of the nut 21. A coil spring 75 surrounds the rod 72, the one end of the spring resting upon the end plate 73 of the screw shaft 20, the other end terminating short of the head member 74 of the rod 72 a distance substantially equal to the normal distance between the bottom of the sealing ring 61 on tube 60 and the outer end of the innermost tube 70.

All of the sealing rings provided in the present device are operative not only to prevent dust and dirt from entering the shield, but they are also capable of transmitting movement from one element to another when brought into engagement with each other.

For purposes of this description, it will be assumed that the device is installed in an airplane for the purpose of operating a door in the fuselage or body of the vehicle. The motor housing 25 is hingedly attached to the fuselage which is considered the stationary part. The load or movable part is in this instance the door which is provided with any suitable operating lever 65, one end of which is pivotally secured to the trunnion lugs 63 of the operating or transfer device. Normally the door is closed, therefore the Fig. 1 shows the operating device in the normal or door closing position.

When the pilot desires to open the door, he closes any suitable switch to complete the circuit to the electric motor in housing 25, rendering it operative to turn the screw shaft 20 so that the nut, held non-rotatable by the door lever 65, will move downwardly on the screw shaft 20 as shown in Fig. 1. As the nut moves downwardly on shaft 20, from its normal position thereon as shown in Figs. 1 and 4, the tube 60, attached to the nut, will move therewith. Thus, as the tube moves downwardly, or away from its normal position, the load supporting trunnion 62, attached to tube 60, will be likewise moved and consequently the door will be accordingly operated. This movement of the tube 60 by the nut will carry with it tube 70 for the tube 70 is frictionally supported by the tube 60 through the sealing collar 61. Therefore as the nut 21 moves from its normal position as shown in Fig. 4 through its first stage of movement into its second position as shown in Fig. 5, the nut 21, tubes 60 and 70 and the rod 72, attached to tube 70, will move as a unit.

In the second position as shown in Fig. 5, the relative positions of the tube 70, particularly its inner end, and the nut 21 remain as normal. However, while the tube 70 is being moved by and with the tube 60, the rod 72 is being moved by the end plate 73 of screw shaft 20 so that the head member 74 of the rod is likewise moved to approach said end plate 73. In the second position, Fig. 5, the rod head 74 has just engaged the upper end of spring 75. During this first stage of nut movement the door is operated from its closed position marked R through the first stage of movement marked A.

As the nut 21 continues its downward movement from the position shown in Fig. 5, in response to rotation of the screw shaft, the tube 60 attached to the nut will, due to its frictional engagement with tube 70, tend to move said tube 70 with it. However, now the head 74 of the rod 72, attached to the end cover 71 of tube 70, is engaged with the spring 75 so that any movement by the tube 70 in the downwardly direction, which moves the end cover 71 away from the end plate 73 of the screw shaft, will tend to compress said spring. This spring is so designed that its resistance to being compressed will overcome the frictional engagement of the sealing ring 61 on tube 60 with the tube 70 thereby holding the tube 70 against further movement with the tube 60. As a result, downward movement of the nut from the position in Fig. 5 will cause the nut-tube 60 and its sealing ring 61 to move relatively to the non-stationary tube 70 until they reach the third stage position as shown in Fig. 6. Here tube 70 is practically completely surrounded by the tube 60 and the nut 21 is in direct contact with the inner end of the tube 70. The device in moving from the position shown in Fig. 5 to that shown in Fig. 6 will have moved its load, the door in this instance, through the portion B of its complete cycle so that now the door has passed through portions A and B of its complete cycle of movement. It will be noted by comparing Figs. 5 and 6 that even though the load has moved through the distance B, the overall length of the device has not been changed. Attention is also called to the position of the tube 50 in Fig. 6. During its movement from the position in Fig. 5 to the position in Fig. 6, the nut and particularly the sealing, abutment ring 66 surrounding it has engaged the sealing, abutment ring 52 in tube 50 so as to move said tube 20 relatively to its surrounding tube 40. The spring 75 as shown in Fig. 6 is still in its normal condition and has not been compressed.

The nut 21, in moving from the position shown in Fig. 6 to the fully extended position as shown in Fig. 7 will move tube 70 with it due to its direct contact with the inner end of said tube. It will also move the tube 50 with it because of the engagement of rings 66 and 52. As the tube 70 is moved with tube 60 and the nut attached thereto, the head 74 on rod 72 is moved toward the end plate 73 secured to the screw shaft 20, thereby compressing the spring as shown in Fig. 7 and energizing it for a future operation.

In traveling from the position, Fig. 6, to the position, Fig. 7, the trunnion 62 passes through its stage of movement represented on the drawings by C. Now the trunnion has been moved from its normal, retracted position R through three stages of movement A, B and C and has reached its fully extended position E. Its entire range of movement from fully retracted position R to fully extended position E is represented by T. In this position the load, a door in this instance, is at full operated, open position. The letter D represents the total increase in length of the device as it moves from fully retracted to fully extended positions. Comparing D and R clearly shows that the amount of increase in overall length of the device is considerably less than the distance through which the load supporting or load moving trunnion is operated by said device. This is a very desirable feature in installations where space is at a premium especially in airplanes.

To close the door, the operator manipulates a switch to cause reverse rotation of the prime mover and consequently the driven screw shaft. In response to such reverse rotation of the screw shaft, the nut 21 will move upwardly on the shaft from the position as shown in Figs. 2 and 7. The energized spring 75 acting through the rod 72 attached to tube 70 will cause said tube to move with the nut-tube 60. This spring influence is maintained until the device, particularly the nut 21, reaches the position shown in Fig. 6 where the spring is again completely expanded and ceases to be an influence to move tube 70. However, the frictional engagement of ring 61 on tube 70 will cause said tube to move with tube 60, as the nut continues its upward travel, until the bumper ring 77 strikes the end of the screw shaft where the tube 70 is again in its normal, fully retracted position. Now tube 60 will move relatively to tube 70 and as the nut 21 moves upwardly, its tube 60 moves the trunnion 62 upwardly relatively to tube 60 and toward the tube 50. When the trunnion 62 reaches a predetermined point in its upward travel, its bumper ring 64 will engage the end of tube 50 after which said tube is moved with tube 60 into normal retracted position.

From the aforegoing it may be seen that the present invention provides an extensible and retractable operating or load transfer device having a simple and positively acting sealing casing surrounding it to protect it against dirt and dust under all operating conditions and in all operating positions.

The feature of the present invention resides in provision of a load transfer device whose increase in length as it moves from fully retracted to fully extended positions for moving the load from one selected position to another, is considerably less than the actual distance thorugh which the load is moved. This lessens space requirements for the installation and operation of devices of this kind.

While the embodiment of the present invention as herein disclosed, constitutes a preferred form, it is to be understood that other forms might be adopted, all coming within the scope of the claims which follow.

What is claimed is as follows:

1. In a device for moving a load, the combination with a rotatable screw shaft and a nut; of a member attached to the nut to render it non-rotatable but capable of longitudinal movement on the screw in response to rotation thereof; an extensible and collapsible shield surrounding the screw and nut, comprising telescopically engaging tubular members, one of which is attached to the nut and has the load supported thereon; and means interposed between the screw shaft and one of said tubular members, said means being energized by the movement of the nut during its final range of movement toward the one end of the screw shaft for moving said one tubular member with the nut as it moves from said one end of the screw shaft toward the opposite end.

2. In a device for moving a load, the combination with a rotatable screw shaft and a nut; of a member attached to the nut to render it non-rotatable but capable of longitudinal movement on the screw in response to rotation thereof; an extensible and collapsible shield surrounding the screw and nut, comprising telescopically engaging tubular members, one of which is attached to the nut and has the load supported thereon; another telescopically extending into and being frictionally supported by the nut supported tube, the inner end of said other tube being spaced from the nut; and means interposed between the screw shaft and said other tube, inoperative while the nut moves from one end through a certain range toward the other end of the screw shaft, then operative to effect relative movement between the nut supported tube and said other tube while the nut moves through another certain range in the same direction and until the nut directly engages said other tube, after which continued movement of the nut and other tube will energize said means while the nut is approaching the end of the shaft, said means then being operative to move the said other tube with the nut as it moves from the adjacent end of the screw shaft toward the opposite end.

3. In a device of the character described, the combination with a rotatable screw shaft; of a nut threaded to said screw shaft and capable of longitudinal movement thereon between retracted and extended positions; a plurality of interfitting tubular members forming a protective shield completely surrounding said screw shaft, said tubular members telescoping in response to movement of the nut for extending or shortening the length of the shield in accordance with the position of the nut on the shaft; and a lost motion connection between the screw shaft and one of said tubular members, said connection comprising means energized in response to the movement of said tubular member by the nut as said nut moves through a final range of movement into its extended position, for causing the said one tubular member to return with the nut as it moves through an initial portion of its range of movement from fully extended position toward its retracted position.

4. In a device of the character described, the combination with a rotatable screw shaft, of a nut threaded to said screw shaft and capable of longitudinal movement thereon between retracted and extended positions; a plurality of interfitting tubular members forming a protective shield completely surrounding said screw shaft, said tubular members telescoping in response to movement of the nut for extending or shortening the length of the shield in accordance with the position of the nut on the shaft; and a lost motion connection between the screw shaft and one of said tubular members, said connection comprising a spring energized in response to the movement of said one tubular member by the nut as it moves through a final range of movement into its extended position, for causing said one tubular member to return with the nut as it moves through an initial range of movement from its fully extended position.

5. In a device of the character described, the combination with a rotatable screw shaft, of a nut threaded to said screw shaft and capable of longitudinal movement thereon between retracted and extended positions; a plurality of interfitting tubular members forming a protective shield completely surrounding said screw shaft, said tubular members telescoping in response to movement of the nut for extending or shortening the length of the shield in accordance with the position of the nut on the shaft; and a lost motion connection between the screw shaft and the most adjacent tubular member surrounding it, said connection comprising a spring, inactive while the nut moves from its retracted position through an initial portion of its range of movement toward its extended position, and active to hold the tubular member most adjacent the screw shaft against movement until the nut moves, directly to engage said tubular member, continued movement of the nut into its extended position then moving said tubular member and energizing said spring for causing said tubular member to move with the nut for a predetermined initial range of movement from its extended toward its retracted position.

6. In a device of the character described, the combination with a rotatable screw shaft; of a nut threaded thereon; a plurality of non-rotatable and telescopically engaging tubular members enclosing the nut and screw, one of said members having its one end secured to the nut to be movable thereby, the other end telescopically receiving and frictionally engaging another tubular member whereby both members may move in unison during a portion of the travel of the nut; a spring rendered effective at the end of a predetermined initial movement of the nut for resisting further movement of the tubular member frictionally engaged by the tubular member secured to the nut thereby establishing relative movement therebetween until the nut moves into direct contact with said other tubular member whereupon further movement of the nut causes both tubes to move in unison and the spring to be compressed thereby energizing it and rendering it operative to cause both tubes to move in unison as the nut moves in the reverse direction.

7. In a device of the character described, the combination with a rotatable, tubular screw shaft; a collar at the end of said screw shaft of a nut threaded to said shaft and capable of longitudinal movement thereon between retracted and extended positions; a plurality of interfitting tubular members forming a protective shield completely surrounding said screw shaft, said tubular members telescoping in response to the movement of the nut for extending or shortening the length of the shield in accordance with the position of the nut on the screw shaft; a rod supported by the tubular member most adjacent the screw shaft, said rod extending into said screw shaft and having a head at its inner end; a spring in the screw shaft, surrounding the rod, said spring resting upon the collar adjacent the outer end of said screw shaft, the other end of the spring being spaced from the head of the rod when the nut is in retracted position but engageable by the rod head when said nut has been moved a predetermined distance toward its extended position, continued movement of the nut in this direction compressing the spring and energizing it to cause the tubular member most adjacent the screw shaft to move with the nut as it moves from its extended position toward its retracted position.

8. In a device of the character described, the combination with a tubular screw shaft rotatable in either direction; of a nut threaded thereon; a plurality of non-rotatable telescopically engaging tubular members enclosing the nut and screw shaft, one of said members having its one end secured to the nut so as to be moved thereby, the other end telescopically receiving and frictionally engaging the innermost tubular member whereby both the nut-tube and the innermost tube may move in unison during a portion of the travel of the nut; a closure member in the outer end of the innermost tubular member; a rod secured to the closure member and extending into the screw shaft, the inner, free end of the rod having a head; a spring in the screw shaft, surrounding the rod, one end of said spring resting upon an abutment flange in the screw shaft adjacent its outer end, the other end of the spring being spaced predeterminately from the head of the rod when the nut is in its retracted position, said spring being engageable by said rod head when the innermost tubular member has been moved into a predetermined position by movement of the nut toward the outer end of the screw shaft, continued movement of the nut causing the spring to resist movement of the innermost tubular member until it is positively engaged by the nut whereupon continued movement of the nut toward the outer end of the shaft will move the innermost tube to compress the spring and energize it to render it effective to return said innermost tube with the nut and the tube secured thereto through a portion of its range of movement toward its retracted position.

9. In a device of the character described, the combination with a prime mover capable of reverse operation; of a screw shaft rotated thereby; a nut threaded to said screw shaft and movable longitudinally thereon between retracted and extended positions; a plurality of non-rotatable, telescopically engaging tubes providing an extensible and contractible shield surrounding the screw shaft, the outer and largest diameter tube being fixed at one end, the third tube having its one end fixed to the nut to be movable therewith; the second tube slidably fitting between the outer and the third tube, the fourth or inner tube telescopically fitting into the third tube; sealing and abutment rings between the second and outer and between the second and third tubes operative to cause relative movements between said tubes in response to movement of the nut between its retracted and extended positions, the inner tube being engageable by the nut and moved thereby when said nut moves through a predetermined final range toward its extended position; and a spring interposed between the screw shaft and inner tube, energized by the movement of the inner tube in one direction for causing the said inner tube to move with the nut as it moves initially in the opposite direction from its extended toward its retracted position.

10. In a device of the character described, the combination with a prime mover capable of reverse operation; of a screw shaft rotated thereby; a nut threaded to said shaft and movable longitudinally thereon between retracted and extended positions; a plurality of interfitting tubes providing a telescoping shield surrounding the screw shaft and comprising an outer tube anchored at one end; an intermediate tube; a nut extension tube, secured at one end to the nut, and an inner tube, all progressively decreasing in diameter in the order mentioned, the intermediate tube being movable by the nut as it moves through predetermined portions of its movement from one position to another, the inner tube being directly engageable by the nut during its final stage of movement into its extended position; sealing and abutment rings between the nut extension tube and intermediate tube and between the intermediate tube and outer tube; a closure member in the outer end of the inner tube; and a spring interposed between the closure member and screw shaft, energized by the movement of the inner tube by the nut as said nut moves through its final stage into fully extended position for returning the inner tube with the nut as said nut moves out of its extended toward its retracted position.

ROBERT W. LELAND.